(12) United States Patent
Sundar Pal et al.

(10) Patent No.: US 10,505,631 B1
(45) Date of Patent: Dec. 10, 2019

(54) METHOD AND SYSTEM FOR ADAPTIVE LIGHT FIDELITY (LI-FI) COMMUNICATION

(71) Applicant: WIPRO LIMITED, Bangalore (IN)

(72) Inventors: Shyam Sundar Pal, Kolkata (IN); Gopinath Das, Balasore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/180,110

(22) Filed: Nov. 5, 2018

(30) Foreign Application Priority Data

Sep. 20, 2018 (IN) .............................. 201841035540

(51) Int. Cl.
*H04B 10/116* (2013.01)
*H04B 10/114* (2013.01)
*H04L 27/26* (2006.01)
*H04N 21/414* (2011.01)
*B64D 11/00* (2006.01)
*H04N 21/214* (2011.01)

(52) U.S. Cl.
CPC ........ *H04B 10/116* (2013.01); *B64D 11/0015* (2013.01); *H04B 10/1149* (2013.01); *H04L 27/26* (2013.01); *H04N 21/2146* (2013.01); *H04N 21/41422* (2013.01)

(58) Field of Classification Search
CPC .......................................... H04B 10/114–116
See application file for complete search history.

(56) References Cited

U.S. PATENT DOCUMENTS 8,380,081 B2   2/2013 Kim et al.
2011/0069957 A1*  3/2011 Kim .................. H04B 3/542
                                                    398/75
2014/0226983 A1   8/2014 Vargas
(Continued)

FOREIGN PATENT DOCUMENTS

CN          104539363 A       4/2015

OTHER PUBLICATIONS

Alshaer, H., et al., "Bidirectional LiFi Attocell Access Point Slicing Scheme", IEEE: Transactions on Network and Service Management, vol. 15, No. 3, Sep. 2018, pp. 909-922.
(Continued)

*Primary Examiner* — Nathan M Cors
(74) *Attorney, Agent, or Firm* — Finnegan, Henderson, Farabow, Garrett & Dunner, LLP

(57) ABSTRACT

A method and system for adaptive Light Fidelity (Li-Fi) communication is disclosed. The method includes establishing a visible light connection with each of the plurality of Li-Fi enabled devices based on control messages received from each of the plurality of Li-Fi enabled devices. The method further includes receiving device information from each of the plurality of Li-Fi enabled devices connected to the Li-Fi node. The method includes determining, by the Li-Fi node, data rate requirement and service type requirement for each of the plurality of Li-Fi enabled devices based on the received device information. The method further includes allocating, by the Li-Fi node, a spectrum of the visible light to at least one Li-Fi enabled device from the plurality of Li-Fi enabled devices based on data rate requirement and service type requirement associated with the at least one Li-Fi enabled device.

19 Claims, 7 Drawing Sheets

(56) References Cited

U.S. PATENT DOCUMENTS

2016/0191156 A1\* 6/2016 Chen ................ H04B 10/116
                                                        398/118
2018/0159621 A1  6/2018 Beas Bujanos et al.
2019/0068281 A1\* 2/2019 Jiang ................ H04B 10/116

OTHER PUBLICATIONS

European Search Report issued in the European Patent Office in counterpart European Application No. 18248052.5 dated Jul. 22, 2019. 9 pages.

\* cited by examiner

METHOD AND SYSTEM FOR ADAPTIVE LIGHT FIDELITY (LI-FI) COMMUNICATION

TECHNICAL FIELD

This disclosure relates generally to Light Fidelity (Li-Fi) networks and more particularly to method and system for adaptive Li-Fi communication.

BACKGROUND

As the number of users of existing wireless communication technologies (for example, Wi-Fi) are increasing, availability of radio spectrum has become a challenge. Deployment of these new age wireless technologies also consume massive energy, which is a threat to the environment. Moreover, these technologies are not suitable under certain conditions (for example, under water or within airplanes).

Some of the above discussed problems are solved by Light-Fidelity (Li-Fi) technology, which is a wireless technology that proposes use of visible light as a media for data transfer and communication. However, existing techniques providing visible light communication in Li-Fi network suffer from many drawbacks that include, delay in channel scan, unnecessary power consumption by a Li-Fi enabled device due to wrong channel scan, incomplete channel scan for the Li-Fi enabled device in case of shorter channel scan duration, or increased power consumption in the Li-Fi enabled device in case of longer channel scan duration.

SUMMARY

In one embodiment, a method of adaptive Light Fidelity (Li-Fi) communication for allocating spectrum of visible light to a plurality of Li-Fi enabled devices in a wireless communication network is disclosed. The method includes establishing, by a Li-Fi node, a visible light connection with each of the plurality of Li-Fi enabled devices based on control messages received from each of the plurality of Li-Fi enabled devices. The method further includes receiving, by the Li-Fi node, device information from each of the plurality of Li-Fi enabled devices connected to the Li-Fi node, in response to establishing the visible light connection with each of the plurality of Li-Fi enabled devices. The method includes determining, by the Li-Fi node, data rate requirement and service type requirement for each of the plurality of Li-Fi enabled devices based on the received device information from each of the plurality of Li-Fi enabled devices connected to the Li-Fi node. The method further includes allocating, by the Li-Fi node, a spectrum of the visible light to at least one Li-Fi enabled device from the plurality of Li-Fi enabled devices based on data rate requirement and service type requirement associated with the at least one Li-Fi enabled device.

In another embodiment, a system for adaptive Light Fidelity (Li-Fi) communication to allocate spectrum of visible light to a plurality of Li-Fi enabled devices in a wireless communication network is disclosed. The system includes a processor; and a memory communicatively coupled to the processor, wherein the memory stores processor instructions, which, on execution, causes the processor to establish a visible light connection with each of the plurality of Li-Fi enabled devices based on control messages received from each of the plurality of Li-Fi enabled devices. The processor instructions further cause the processor to receive device information from each of the plurality of Li-Fi enabled devices connected to the Li-Fi node, in response to establishing the visible light connection with each of the plurality of Li-Fi enabled devices. The processor instructions cause the processor to determine data rate requirement and service type requirement for each of the plurality of Li-Fi enabled devices based on the received device information from each of the plurality of Li-Fi enabled devices connected to the Li-Fi node. The processor instructions further cause the processor to allocate a spectrum of the visible light to at least one Li-Fi enabled device from the plurality of Li-Fi enabled devices based on data rate requirement and service type requirement associated with the at least one Li-Fi enabled device.

In yet another embodiment, a non-transitory computer-readable storage medium having stored thereon, a set of computer-executable instructions for allocating spectrum of visible light to a plurality of Li-Fi enabled devices in a wireless communication network, causing a computer comprising one or more processors to perform steps comprising: establishing a visible light connection with each of the plurality of Li-Fi enabled devices based on control messages received from each of the plurality of Li-Fi enabled devices; receiving device information from each of the plurality of Li-Fi enabled devices connected to the Li-Fi node, in response to establishing the visible light connection with each of the plurality of Li-Fi enabled devices; determining data rate requirement and service type requirement for each of the plurality of Li-Fi enabled devices based on the received device information from each of the plurality of Li-Fi enabled devices connected to the Li-Fi node; and allocating a spectrum of the visible light to at least one Li-Fi enabled device from the plurality of Li-Fi enabled devices based on data rate requirement and service type requirement associated with the at least one Li-Fi enabled device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
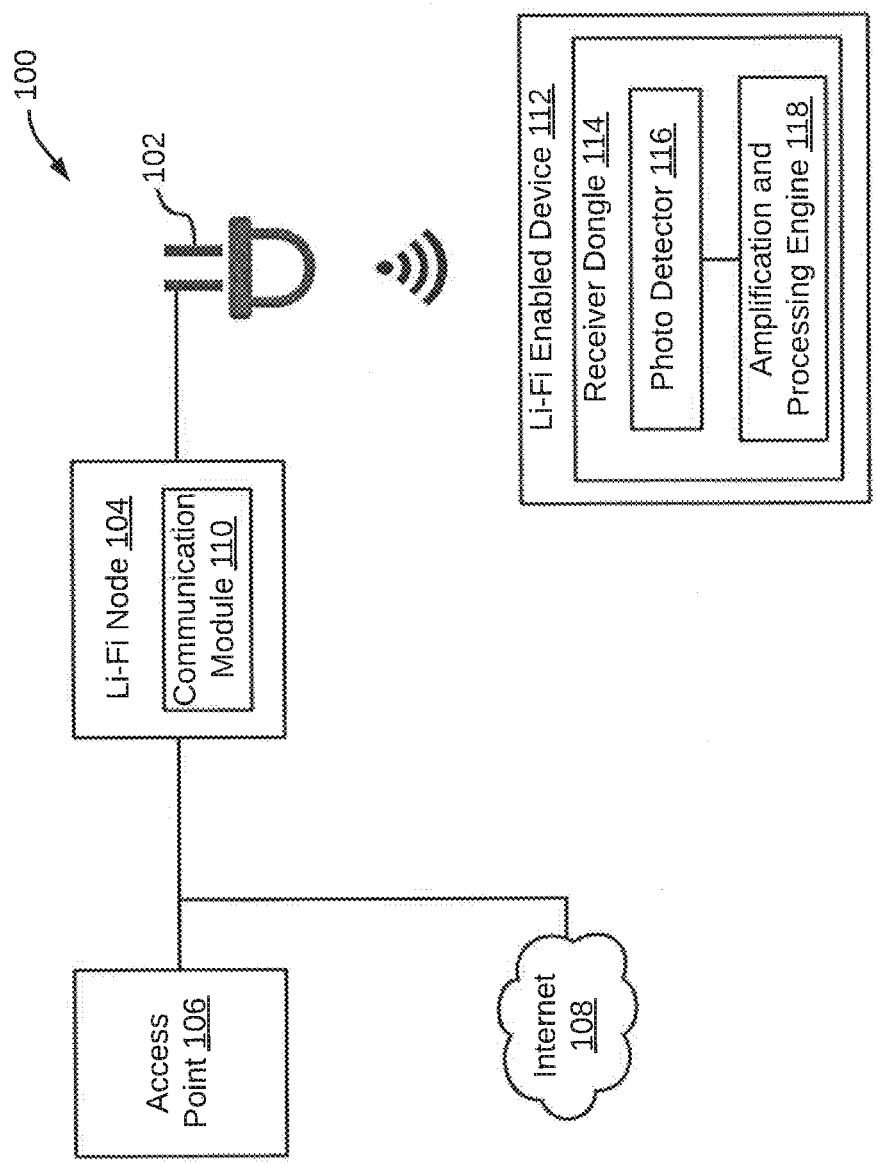
FIG. 1 illustrates a Light Fidelity (Li-Fi) network, in accordance with an embodiment.

Additional illustrative embodiments are listed below. In one embodiment, a Light Fidelity (Li-Fi) network 100 is illustrated in FIG. 1. The Li-Fi network 100 includes a plurality of Light Emitting Diodes (LED) lamps (for example, an LED lamp 102) that is controlled by a Li-Fi node 104. The Li-Fi node 104 turns the LED lamp 102 'ON' to transmit a digital 1 and turns the LED lamp 102 'OFF' to transmit a digital 0. The LED lamp 102 is rapidly turned 'ON' and 'OFF' to transmit data, which may be streamed from an access point 106 and/or the Internet 108. In an embodiment, the Li-Fi node 104 may also act as the access point 106. The access point 106 is further connected to an external network (not shown in FIG. 1). The External network, for example, may include, but is not limited to Global System for Mobile communications (GSM), Third Generation (3G), Universal Mobile Telecommunications System (UMTS), 4G, or 5G. The external network sends data and control message to the Li-Fi node 104 (via the access point 106) through Down Link Network to Li-Fi Interface (DLNLI). Similarly, the external network receives control or data packets from the Li-Fi node 104 (via access point 106) through Up Link Li-Fi Interface (ULLNI).

The streamed data is passed through the Li-Fi node 104, which varies the rate at which the LED lamp 102 is flickered in order to encode and transmit the streamed data. It will be apparent to a person skilled in the art that multiple such LED lamps may be used to encode and transmit data. It will be further apparent to a person skilled in the art that combination of different color LED lamps (for example, red, green, and blue) may be used to alter frequency of light, such that each frequency encodes a different data channel.

The Li-Fi node further includes a communication module 110. Various modules within the communication module 110 are further explained in detail in conjunction with FIG. 2. The communication module 110 transmits the encoded data and control messages through the LED lamp 102 to a Li-Fi enabled device 112 using a Down Link Li-Fi to Device Interface (DLLDI). In a similar manner, the Li-Fi enabled device 112 sends data and control messages to the communication module 110 through an Up Link Device to Li-Fi Interface (ULDLI). In the Li-Fi enabled device 112, a receiver dongle 114 that includes a photo detector 116 and an amplification and processing engine 118 receives the encoded data transmitted by the LED lamp 102. The photo detector 116 is a light sensitive device that decodes the flickering rate of the LED lamp 102 and converts it back to the streamed data for consumption by the Li-Fi enabled device 112. After conversion though, the amplification and processing engine 118 further processes and amplifies the streamed data in order to enable the Li-Fi enabled device 112 to process the streamed data. It will be apparent to a person skilled in the art that multiple Li-Fi enabled devices may be in communication with the LED lamp 102. Examples of the Li-Fi enabled device 112 may include, but are not limited to a smartphone, a laptop, a tablet, a phablet, a computer, a gaming console, a set-top box, and an Internet of Things (IoT) enabled smart device that has wireless connectivity.

Figure 2:
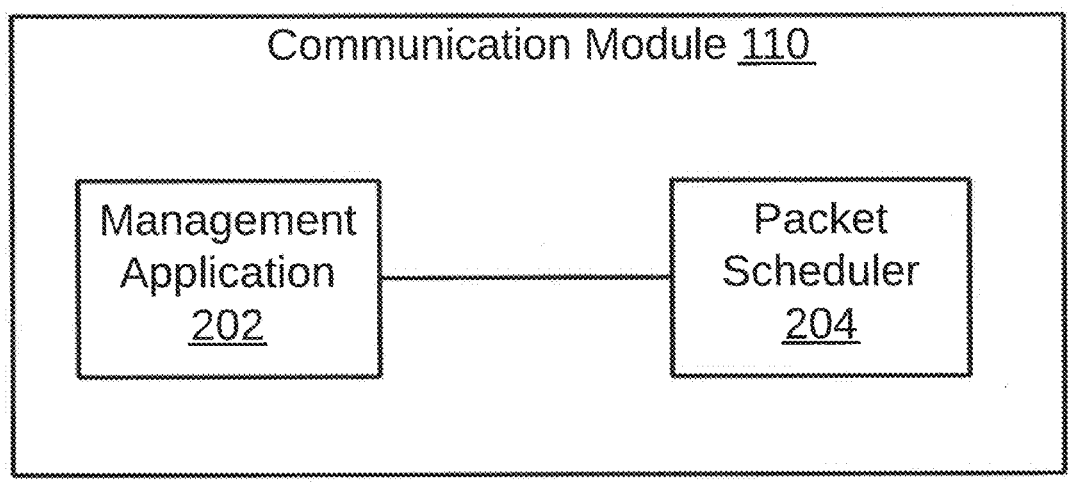
FIG. 2 is a block diagram illustrating a communication module within a Li-Fi node, in accordance with an embodiment.

Referring now to FIG. 2, a block diagram of the communication module 110 in the Li-Fi node 104 is illustrated, in accordance with an embodiment. The communication module 110 further includes a management application 202 and a packet scheduler 204. The management application 202 stores configuration related information about one or more Li-Fi enabled devices (for example, Li-Fi enabled device 112). The Li-Fi node 104 retrieves configuration information from the management application 202 during request for service from a Li-Fi enabled device (for example, the Li-Fi enabled device 112). The configuration information may include a set of configuration parameters, for example, data rate, device type, subscription type, and Quality of Service (QoS). This is further explained in detail in conjunction with FIG. 3.

The packet scheduler 204 provides scheduling information to the Li-Fi node 104 in order to enable the Li-Fi node 104 to determine the data-rate for one or more Li-Fi devices (for example, the Li-Fi enabled device 112). Based on the scheduling information the data is transmitted from the Li-Fi node 104 to the one or more Li-Fi enabled devices. This is further explained in detail in conjunction with FIG. 3 to FIG. 6.

Figure 3:
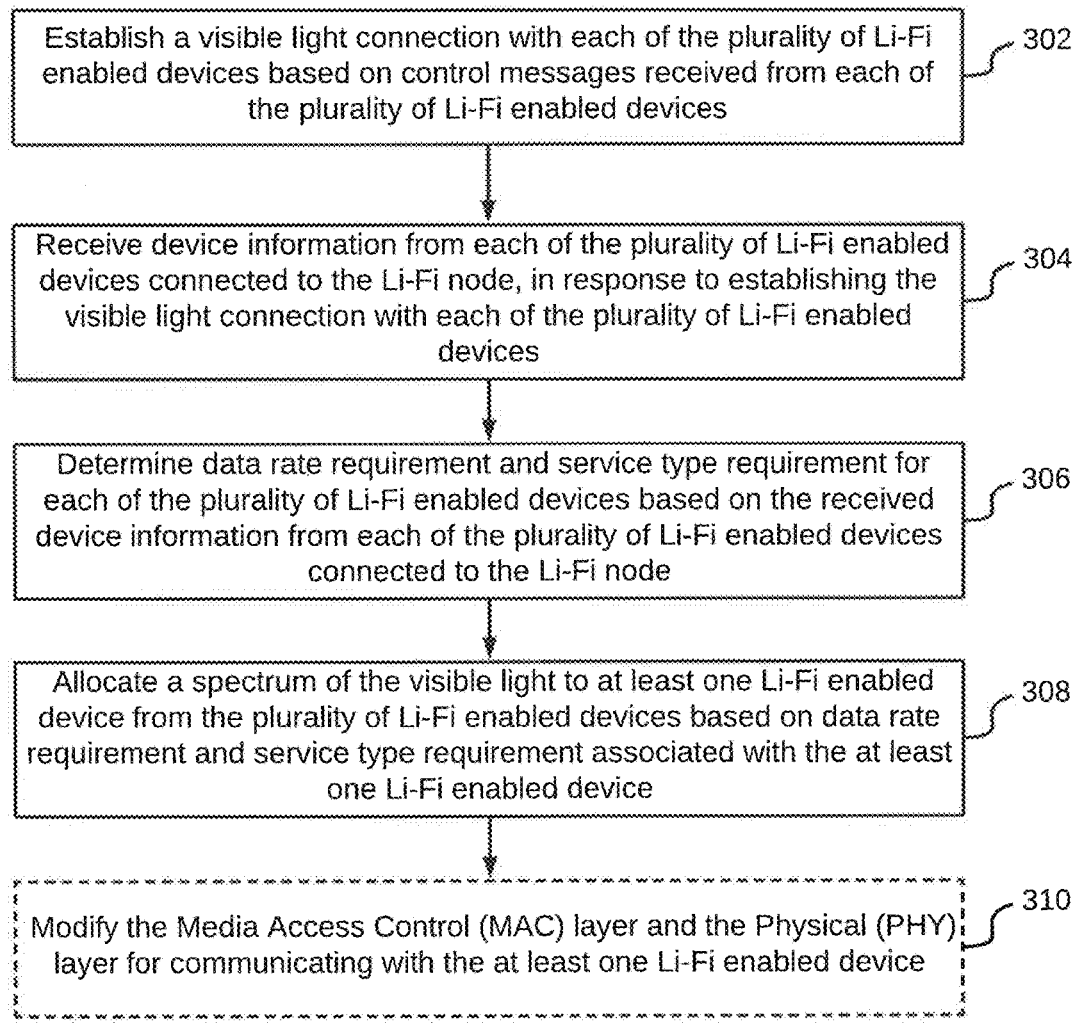
FIG. 3 illustrates a flowchart of a method for adaptive Li-Fi communication for allocating spectrum of visible light to a plurality of Li-Fi enabled devices in a wireless communication network, in accordance with an embodiment.

Referring now to FIG. 3, a flowchart of a method for adaptive Li-Fi communication for allocating spectrum of visible light to a plurality of Li-Fi enabled devices in a wireless communication network is illustrated, in accordance with an embodiment. At initialization of the Li-Fi node 104, the Li-Fi node 104 is configured based on a set of configuration parameters. The set of configuration parameters may include, but are not limited to data rate, device type, subscription type, and Quality of Service (QoS). The date rate may be configured based on the different device type subscription of different Li-Fi enable devices. The device type Media Access Control (MAC) layer records device information for Li-Fi enabled devices for different types of required service. The subscription type is stored in the management application 202 for service requests specific to Li-Fi enabled devices. The QoS is stored to monitor the data rate as per requests received from the Li-Fi enabled device. In an embodiment, once the Li-Fi node 104 is initialized, if there are one or more modifications in the set of configuration parameters, the Li-Fi node 104 is reconfigured. This is further explained in detail in conjunction with FIG. 4.

Once the Li-Fi node 104 has been initialized, based on control messages received from each of the plurality of Li-Fi enabled devices, the Li-Fi node 104, at step 302, establishes a visible light connection with each of the plurality of Li-Fi enabled devices. In an exemplary embodiment, in order to establish a visible light connection with a Li-Fi enabled device, the Li-Fi node 104 may perform the following steps:

Step 1: Create a list of Li-Fi enabled devices that require to connect with the Li-Fi node 104 as $Dev_{List}$ Step 2: For each $i^{th}$ Li-Fi enabled device in the $Dev_{List}$, where i<=Num($Dev_{List}$) the Li-Fi node 104 performs the following:
  a. Receive request from the $i^{th}$ Li-Fi enabled device to connect to the Li-Fi node 104
  b. Determine control message for the $i^{th}$ Li-Fi enabled device to establish the connection through a visible light connection control message
  c. Assign a unique identifier to the $i^{th}$ Li-Fi enabled device
  d. Send the connection request accept message to the $i^{th}$ Li-Fi enabled device
  e. Send information associated with the Li-Fi node 104 to the $i^{th}$ Li-Fi enabled device to configure the $i^{th}$ Li-Fi enabled device In response to establishing the visible light connection with each of the plurality of Li-Fi enabled devices, the Li-Fi node 104, at step 304, receives device information from each of the plurality of Li-Fi enabled devices connected to the Li-Fi node 104. The device information is then used by the Li-Fi node 104 for configuring each of the plurality of Li-Fi enabled devices. The device information for a Li-Fi enabled device includes device type, service type, and data rate associated with the Li-Fi enabled device. The device information is captured for each of the plurality of Li-Fi enabled devices. In an exemplary embodiment, to capture device information for each Li-Fi enabled device in $Dev_{List}$ (which is the list of all Li-Fi enabled devices in the range of the Li-Fi node 104), the following steps are performed:

Step 1: For each of $i^{th}$ enabled device, where $i<=Num$ $(Dev_{List})$, the Li-Fi node 104 stores device information in a memory (which may be persistent memory) based on equation 1 given below:

$$Dev_{Info} < Dev_{LiFi}(i) > \quad (1)$$

where, $Dev_{info}$ is the device information for $i^{th}$ Li-Fi enabled device;

Num is the total number of Li-Fi enabled devices in the $Dev_{List}$.

The above step is repeated for all the Li-Fi enabled devices in the $Dev_{List}$. Once the Li-Fi node 104 has received device information from each Li-Fi enabled device in the $Dev_{List}$, the Li-Fi node 104 configures each Li-Fi enabled device in the $Dev_{List}$.

Once each of the plurality of Li-Fi enabled devices are configured, based on the device information for each of the plurality of Li-Fi enabled devices, the Li-Fi node 104, at step 306, determines data rate requirement and service type requirement for each of the plurality of Li-Fi enabled devices. The data rate and service type requirement are determined in order to allocated required resources to each of the plurality of Li-Fi enabled devices. In an exemplary embodiment, for each PI Li-Fi enabled device in the $Dev_{List}$, the Li-Fi node 104 performs the following steps:

Step 1: Determine the service type received from an $i^{th}$ Li-Fi enabled device Step 2: Determine the data rate requirement for the $i^{th}$ Li-Fi enabled device as: $DataRate_{Dev}(i)$ Based on data rate requirement and service type requirement associated with one or more Li-Fi enabled devices, the Li-Fi node 104, at step 308, allocates a spectrum of the visible light to the one or more Li-Fi enabled devices from the plurality of Li-Fi enabled devices. In an embodiment, based on the data rate requirement and the service type requirement associated with the one or more Li-Fi enabled devices, the Li-Fi node 104 determines and allocates a required spectrum of the visible light for the one or more of the plurality of Li-Fi enabled devices. However, if the required spectrum of the visible light is not available, the Li-Fi node 104 determines a spectrum of higher frequency when compared with the required spectrum to be allocated to the one or more of Li-Fi enabled devices. This is further explained in detail in conjunction with FIG. 5.

Once a particular spectrum of the visible light is allocated to the one or more Li-Fi enabled devices, the Li-Fi node 104, at step 310, may modify the Media Access Control (MAC) layer and the Physical (PHY) layer in the Li-Fi node 104 for communicating with the one or more Li-Fi enabled devices.

Figure 4:
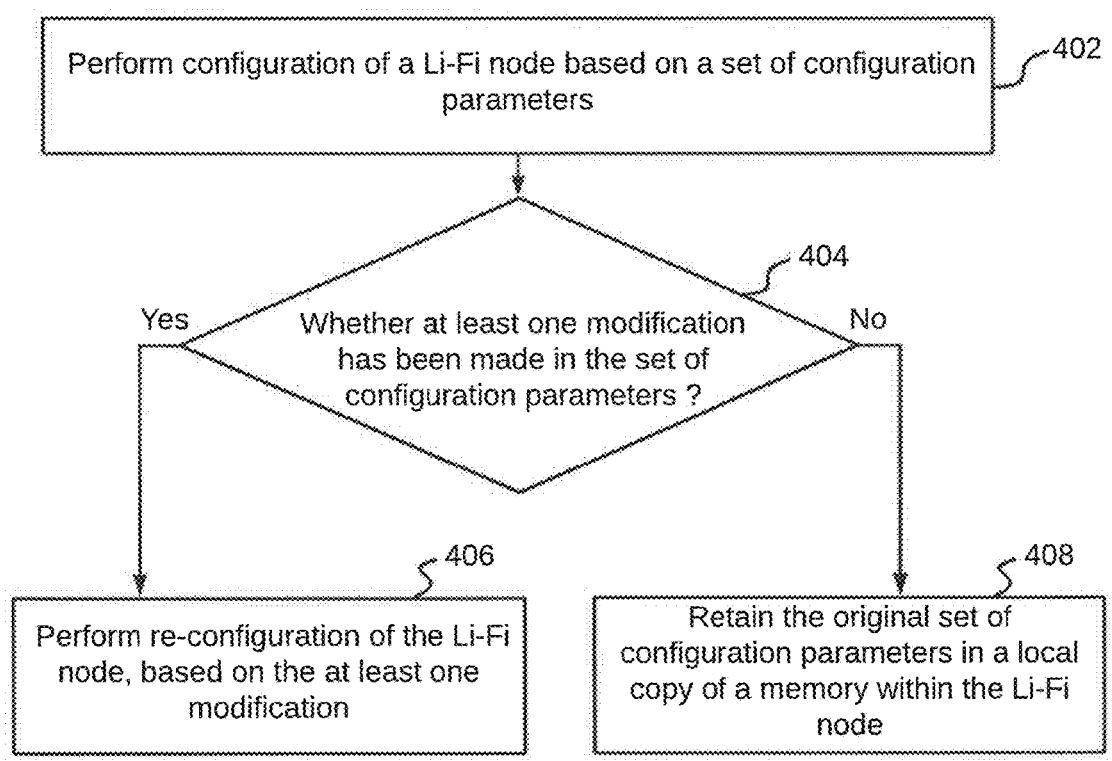
FIG. 4 illustrates a flowchart of a method for configuring and re-configuring a Li-Fi node based on configuration parameters, in accordance with an embodiment.

Referring now to FIG. 4, a flowchart of a method for configuring and re-configuring the Li-Fi node 104 based on configuration parameters is illustrated, in accordance with an embodiment. At step 402, configuration of the Li-Fi node 104 is performed based on a set of configuration parameters. The set of configuration parameters may include, but are not limited to data rate, device type, subscription type, and Quality of Service (QoS). The set of configuration parameters received by the Li-Fi node 104 are stored as a local copy in a memory. These configuration parameters have already been explained in detail in conjunction with FIG. 3.

At step 404, a check is performed to identify one or more modifications in the set of configuration parameters. The one or more modifications may include addition of new configuration parameters to the set of configurations parameters. The one or more modifications may include change in one or more existing configuration parameters in the set of configuration parameters. If one or more modifications in the set of configuration parameters is identified, re-configuration of the Li-Fi node 104 is performed at step 406, based on the one or more modifications thus identified. Additionally, the Li-Fi node 104 may update the local copy of the configuration parameters based on the one or more identified modifications. Referring back to step 404, if no modifications in the set of configuration parameter is identified, the original set of configuration parameters are retained in the local copy of the memory at step 408.

Figure 5:
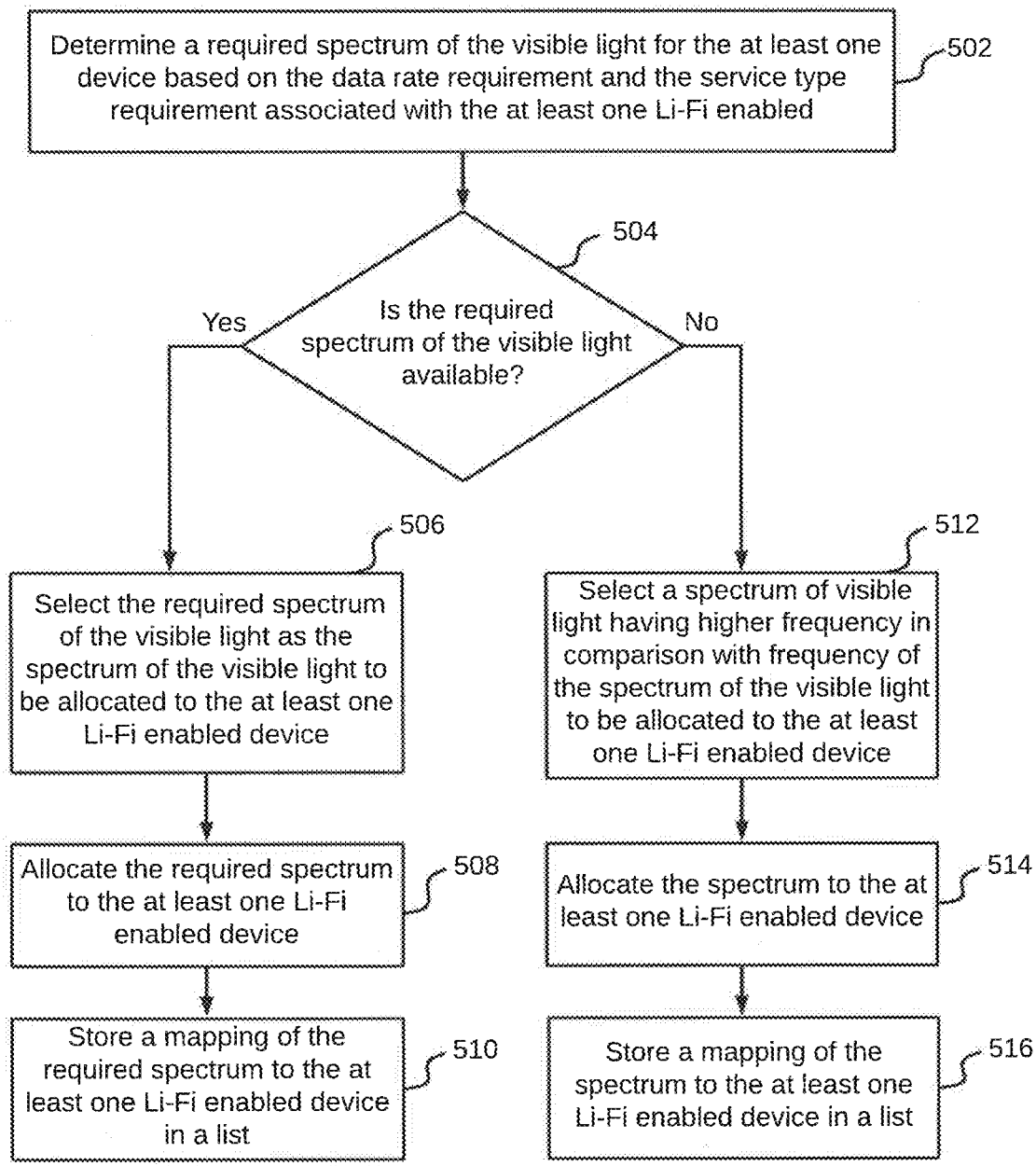
FIG. 5 illustrates a flowchart of a method for configuring and re-configuring a Li-Fi node based on configuration parameters, in accordance with an embodiment.

Referring now to FIG. 5, a flowchart of a method for configuring and re-configuring the Li-Fi node 104 based on configuration parameters is illustrated, in accordance with an embodiment. Based on the data rate requirement and the service type requirement associated with one or more Li-Fi enabled devices, a required spectrum of the visible light is determined, at step 502, for the one or more Li-Fi enabled devices.

At step 504 a check is performed to determine whether the required spectrum is available for allocation. If the required spectrum is available, the required spectrum is selected, at step 506, to be allocated to the one or more Li-Fi enabled devices, as the spectrum of the visible light. Thereafter, at step 508, the required spectrum is allocated to the one or more Li-Fi enabled devices. At step 510, a mapping of the required spectrum to the one or more Li-Fi enabled device is stored in a list.

However, if the required spectrum is not available, a spectrum of visible light that has higher frequency in comparison with frequency of the spectrum of the visible light to be allocated to the one or more Li-Fi enabled device is selected at step 512. The spectrum of visible light that has higher frequency is then allocated to the one or more Li-Fi enabled devices at step 514. Thereafter, at step 516, a mapping of the spectrum to the one or more Li-Fi enabled devices is stored in the list. In an exemplary embodiment, the Li-Fi node 104 performs the following steps for allocation of a spectrum of visible light to an $i^{th}$ Li-Fi enabled device from the $Dev_{List}$:

Step 1: Determine a required spectrum of the visible light for the $i^{th}$ Li-Fi enabled device as: $Dev_{LightSpec}(i)$ Step 2: Check if $Dev_{LightSpec}(i)$ is available for allocation to the $i^{th}$ Li-Fi enabled device Step 3: If $Dev_{LightSpec}(i)$ is available for allocation, select $Dev_{LightSpec}(i)$ for allocation to the $i^{th}$ enabled device Step 4: If $Dev_{LightSpec}(I)$ is not available for allocation, select a spectrum of visible light having higher frequency than $Dev_{LightSpec}(i)$ to the $i^{th}$ Li-Fi enabled device Step 5: Store a mapping of the selected spectrum for allocation to the $i^{th}$ Li-Fi enabled device as: $<Dev_{List}, Dev_{LightSpec}(i)>$ Step 6: Allocate the selected spectrum to the $i^{th}$ Li-Fi enabled device based on the mapping The above steps are performed for each Li-Fi enabled device in the $Dev_{List}$.

Figure 6:
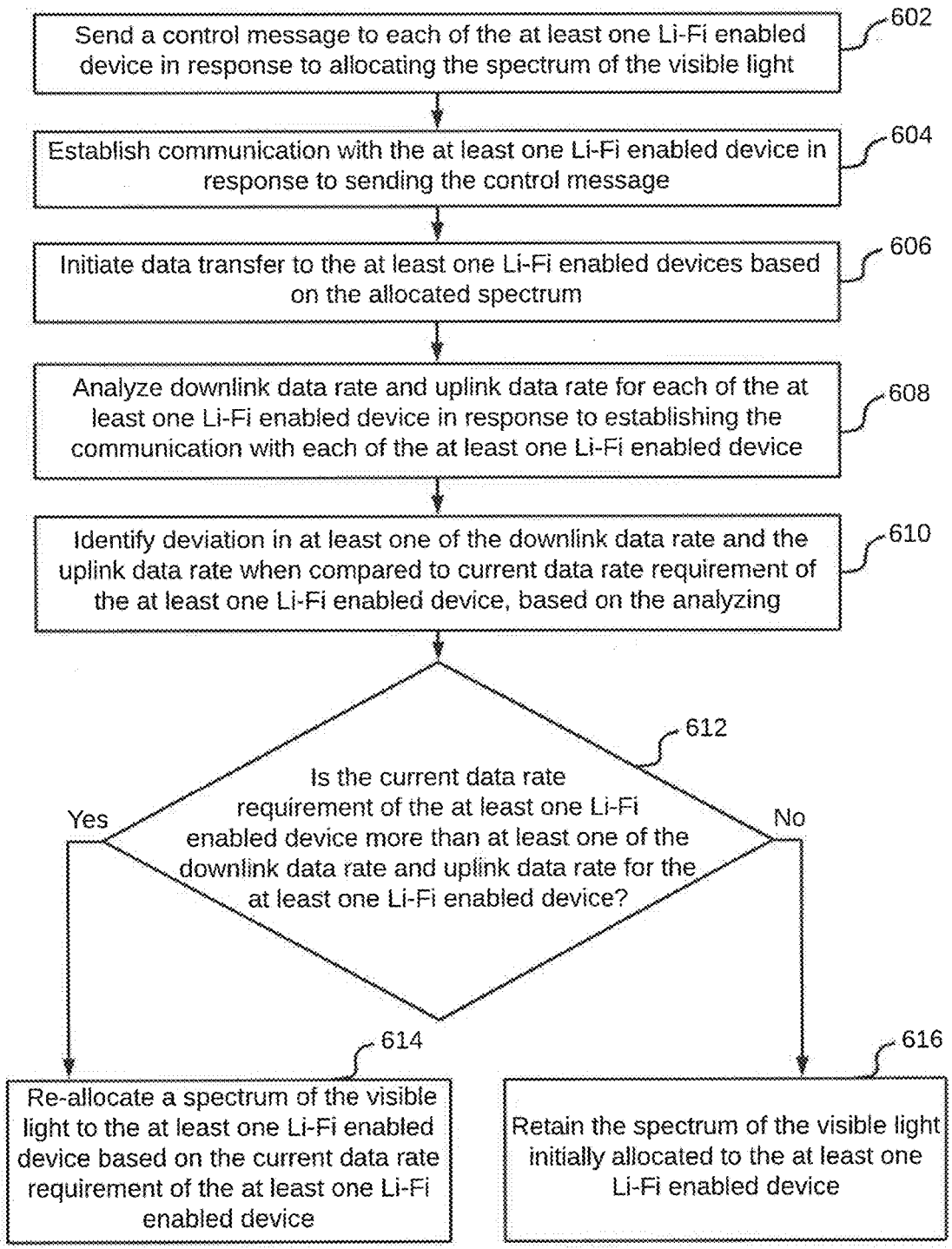
FIG. 6 illustrates a flowchart of a method for reallocating a spectrum of the visible light to one or more Li-Fi enabled devices, in accordance with an embodiment.

Referring now to FIG. 6, a flowchart of a method for reallocating a spectrum of the visible light to one or more Li-Fi enabled devices is illustrated, in accordance with an embodiment. Once a spectrum of the visible light is allocated to the one or more of the Li-Fi enabled devices, a control message is sent, at step 602, to each the one or more Li-Fi enabled devices. The control message is sent to the one or more Li-Fi enabled devices after necessary modifications have been made to the MAC layer and the PHY layer of the Li-Fi node 104. Thereafter, communication is established with the one or more Li-Fi enabled devices at step 604, in response to sending the control message. In an exemplary embodiment, the communication may be established with an $i^{th}$ Li-Fi enabled device in the $Dev_{List}$ by performing the following steps. The steps are repeated for each $i^{th}$ Li-Fi enabled device in the $Dev_{List}$:

Step 1: Initiate communication with the $i^{th}$ Li-Fi enabled device

Step 2: Apply optical OFDM in 802.11a based modification in the PHY layer and modify the MAC layer for data link establishment Step 3: Transfer data from the MAC layer to an upper layer in communication After establishing communication with the one or more Li-Fi enabled devices, the Li-Fi node 104 initiates data transfer, at step 606, to the one or more Li-Fi enabled devices based on the allocated spectrum and the associated required data rate. In an exemplary embodiment, based on the allocated spectrum, the Li-Fi node 104 transfer data in the downlink to an $i^{th}$ Li-Fi enabled device from the $Dev_{List}$ based on the following steps. These steps are repeated for each $i^{th}$ Li-Fi enabled device in the $Dev_{List}$:

Step 1: Receive downlink data from the Li-Fi node 104 and buffer data as: Data($Dev_{List}$(i))

Step 2: Schedule data transmission time as: TransTime($Dev_{List}$(i))

Step 3: Start timer TransTime($Dev_{List}$(i))

Step 4: For each time slot j, i.e., TimeSlot(j), determine the packet size for each time slot as: PackSize Step 5: Transmit packets based on the allocated spectrum of the visible light Step 6: Check if Total(PackSize)=Data($Dev_{List}$(i))
When, Total(PackSize) is equal to Data($Dev_{List}$(i)), stop timer TransTime($Dev_{List}$(i));
When Total(PackSize) is not equal to Data($Dev_{List}$(i)), return to Step 4

After initiating the data transfer to each of the one or more Li-Fi enabled devices, downlink data rate and uplink data rate is analyzed, at step 608, for each of the one or more Li-Fi enabled devices. Based on the analyzing, deviation in one or more of the downlink data rate and the uplink data rate when compared to current data rate requirement of the one or more Li-Fi enabled device is identified at step 610.

Thereafter, a check is performed at step 612, to determine whether the current data rate requirement of the one or more Li-Fi enabled devices is more than one or more of the downlink data rate and uplink data rate for each of the one or more Li-Fi enabled devices. When the current data rate requirement of the one or more Li-Fi enabled devices is more than one or more of the downlink data rate and uplink data rate for the one or more Li-Fi enabled devices, at step 614, a spectrum of the visible light is re-allocated to the one or more Li-Fi enabled devices based on the current data rate requirement of the at one or more Li-Fi enabled devices. The frequency of the re-allocated spectrum of the visible light is different from the frequency of the allocated spectrum of the visible light.

Referring back to step 612, when the current data rate requirement of the one or more Li-Fi enabled devices is less than one or more of the downlink data rate and uplink data rate for the one or more Li-Fi enabled devices, the spectrum of the visible light initially allocated to the one or more Li-Fi enabled devices is retained at step 616. In an exemplary embodiment, the Li-Fi node 104 monitors data rate in downlink for an $i^{th}$ Li-Fi enabled device in the $Dev_{List}$ (i.e., from the Li-Fi node 104 to the $i^{th}$ Li-Fi enabled device). The Li-Fi node 104 further analyzes the cause of deviation of the data rate and resource allocation problem, if any, for the $i^{th}$ Li-Fi enabled device. In this exemplary embodiment, the Li-Fi node 104 performs the following steps for the PI Li-Fi enabled device in the $Dev_{List}$. These steps are repeated for each Li-Fi enabled device in the $Dev_{List}$:

Step 1: Determine the current data rate for the $i^{th}$ Li-Fi enabled device as: $DataRate_{Curr}(I)$ Step 2: Receive the required data rate for the $i^{th}$ Li-Fi enabled device as: $DataRate_{Dev}(i)$ Step 3: Check if $(DataRate_{Dev}(i)+DataRate_{Th}) < DataRate_{Curr}(i) < (DataRate_{Dev}(i)-DataRate_{Th})$ In other words, it is checked whether the current data rate for the $i^{th}$ Li-Fi enabled device is greater than summation of the required data rate and a data rate threshold. The data rate threshold may be defined by an administrator and may be adjusted. Additionally, it is checked whether the current data rate for the $i^{th}$ Li-Fi enabled device is less than the difference between the required data rate and the data rate threshold. Performing these checks enables the Li-Fi node 104 to determine whether resource allocation in the MAC and the PHY layer of the Li-Fi node 104 needs to be corrected and packet size for each time slot needs to be modified for the $i^{th}$ Li-Fi enabled device.

Step 4: If step 3 is true, perform the above steps for the next $i^{th}$ Li-Fi enabled device Step 5: If step 3 is not true, resource allocation in the MAC and the PHY layer of the Li-Fi node 104 is corrected and packet size, i.e., PackSize for each time slot is modified.

Figure 7:
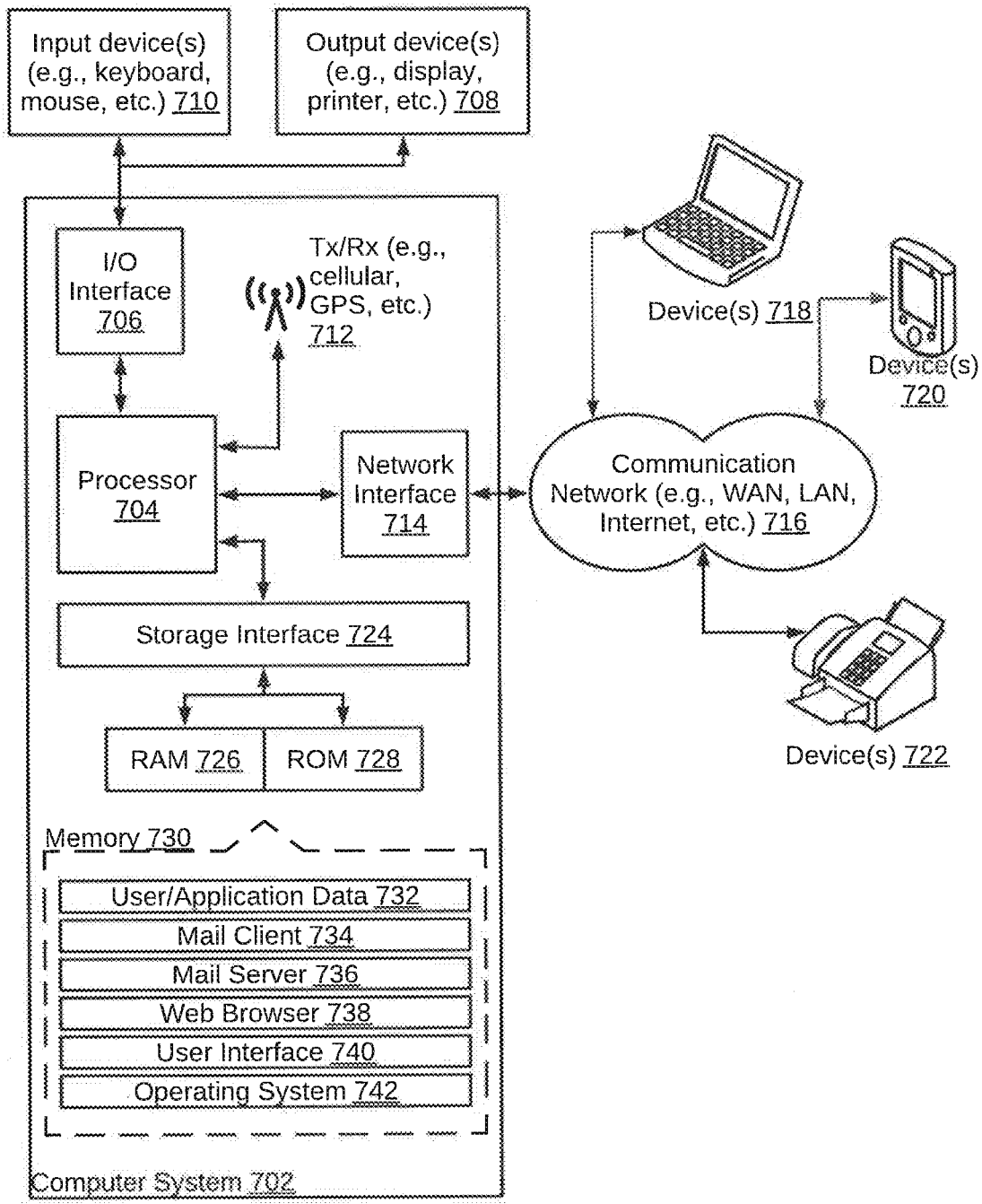
FIG. 7 illustrates a block diagram of an exemplary computer system for implementing various embodiment.

FIG. 7 is a block diagram of an exemplary computer system for implementing various embodiments. Computer system 702 may include a central processing unit ("CPU" or "processor") 704. Processor 704 may include at least one data processor for executing program components for executing user- or system-generated requests. A user may include a person, a person using a device such as such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 918-PMB9800® transceiver, or the like), providing IEEE 802.11a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of these devices.

In some embodiments, processor 704 may be disposed in communication with one or more memory devices (e.g., RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (e.g., any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical User Interfaces (GUIs) may be employed, including, without limitation, Apple® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APis), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and system for adaptive Light Fidelity (Li-Fi) communication. The method and system provide improved Li-Fi communication for categorized Li-Fi enabled devices in short range data transfer in a wireless network. Further, Hermitian symmetry is imposed on modulated subcarriers to generate a real time-domain signal. Hence, the sampling rate and the baseband are doubled to preserve the data rate.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of adaptive Light Fidelity (Li-Fi) communication for allocating spectrum of visible light to a plurality of Li-Fi enabled devices in a wireless communication network, the method comprising:
    establishing, by a Li-Fi node, a visible light connection with each of the plurality of Li-Fi enabled devices based on control messages received from each of the plurality of Li-Fi enabled devices;
    receiving, by the Li-Fi node, device information from each of the plurality of Li-Fi enabled devices connected to the Li-Fi node, in response to establishing the visible light connection with each of the plurality of Li-Fi enabled devices;
    determining, by the Li-Fi node, a data rate requirement and a service type requirement for each of the plurality of Li-Fi enabled devices based on the received device information from each of the plurality of Li-Fi enabled devices connected to the Li-Fi node; and
    allocating, by the Li-Fi node, a spectrum of the visible light to at least one Li-Fi enabled device from the plurality of Li-Fi enabled devices based on data rate requirement and service type requirement associated with the at least one Li-Fi enabled device.

2. The method of claim 1, further comprising modifying a Media Access Control (MAC) layer and a Physical (PHY) layer for communicating with the at least one Li-Fi enabled device.

3. The method of claim 1, wherein the allocating the spectrum of the visible light to the at least one Li-Fi enabled device comprises:
    determining a required spectrum of the visible light for the at least one Li-Fi enabled device based on the data rate requirement and the service type requirement associated with the at least one Li-Fi enabled; and
    determining availability of the required spectrum of the visible light.

4. The method of claim 3 further comprising selecting the required spectrum of the visible light as the spectrum of the visible light to be allocated to the at least one Li-Fi enabled device, when the required spectrum of the visible light is available.

5. The method of claim 3 further comprising selecting a spectrum of visible light having higher frequency in comparison with frequency of the spectrum of the visible light to be allocated to the at least one Li-Fi enabled device, when the required spectrum of the visible light is unavailable.

6. The method of claim 1 further comprising:
    sending a control message to each of the at least one Li-Fi enabled device in response to allocating the spectrum of the visible light; and
    establishing a communication with the at least one Li-Fi enabled device in response to sending the control message.

7. The method of claim 6 further comprising:
    analyzing a downlink data rate and an uplink data rate for each of the at least one Li-Fi enabled device in response to establishing the communication with each of the at least one Li-Fi enabled device; and
    identifying deviation in at least one of the downlink data rate and the uplink data rate when compared to current data rate requirement of the at least one Li-Fi enabled device, based on the analyzing.

8. The method of claim 7 further comprising re-allocating a spectrum of the visible light to the at least one Li-Fi enabled device based on the current data rate requirement of the at least one Li-Fi enabled device, when the current data rate requirement is more than at least one of the downlink data rate and the uplink data rate for each of the at least one Li-Fi enabled device, wherein the frequency of the re-allocated spectrum of the visible light is different from the frequency of the allocated spectrum of the visible light.

9. The method of claim 1, further comprising:
performing configuration of the Li-Fi node, based on a set of configuration parameters;
identifying at least one modification in the set of configuration parameters; and
performing re-configuration of the Li-Fi node, based on the at least one modification.

10. A system for adaptive Light Fidelity (Li-Fi) communication to allocate spectrum of visible light to a plurality of Li-Fi enabled devices in a wireless communication network, the system comprising a Li-Fi node comprising:
a processor; and
a memory communicatively coupled to the processor, wherein the memory stores processor instructions, which, on execution, causes the processor to:
establish a visible light connection with each of the plurality of Li-Fi enabled devices based on control messages received from each of the plurality of Li-Fi enabled devices;
receive device information from each of the plurality of Li-Fi enabled devices connected to the Li-Fi node, in response to establishing the visible light connection with each of the plurality of Li-Fi enabled devices;
determine data rate requirement and service type requirement for each of the plurality of Li-Fi enabled devices based on the received device information from each of the plurality of Li-Fi enabled devices connected to the Li-Fi node; and
allocate a spectrum of the visible light to at least one Li-Fi enabled device from the plurality of Li-Fi enabled devices based on a data rate requirement and a service type requirement associated with the at least one Li-Fi enabled device.

11. The system of claim 10, wherein the processor instructions further cause the processor to modify a Media Access Control (MAC) layer and a Physical (PHY) layer for communicating with the at least one Li-Fi enabled device.

12. The system of claim 10, wherein to allocate the spectrum of the visible light to the at least one Li-Fi enabled device, the processor instructions further cause the processor to:
determine a required spectrum of the visible light for the at least one Li-Fi enabled device based on the data rate requirement and the service type requirement associated with the at least one Li-Fi enabled; and
determine availability of the required spectrum of the visible light.

13. The system of claim 12, wherein the processor instructions further cause the processor to select the required spectrum of the visible light as the spectrum of the visible light to be allocated to the at least one Li-Fi enabled device, when the required spectrum of the visible light is available.

14. The system of claim 12, wherein the processor instructions further cause the processor to select a spectrum of visible light having higher frequency in comparison with frequency of the spectrum of the visible light to be allocated to the at least one Li-Fi enabled device, when the required spectrum of the visible light is unavailable.

15. The system of claim 10, wherein the processor instructions further cause the processor to:
send a control message to each of the at least one Li-Fi enabled device in response to allocating the spectrum of the visible light; and
establish a communication with the at least one Li-Fi enabled device in response to sending the control message.

16. The system of claim 15, wherein the processor instructions further cause the processor to:
analyze a downlink data rate and an uplink data rate for each of the at least one Li-Fi enabled device in response to establishing the communication with each of the at least one Li-Fi enabled device; and
identify deviation in at least one of the downlink data rate and the uplink data rate when compared to current data rate requirement of the at least one Li-Fi enabled device, based on the analyzing.

17. The system of claim 16, wherein the processor instructions further cause the processor to re-allocate a spectrum of the visible light to the at least one Li-Fi enabled device based on the current data rate requirement of the at least one Li-Fi enabled device, when the current data rate requirement is more than at least one of the downlink data rate and the uplink data rate for each of the at least one Li-Fi enabled device, wherein the frequency of the re-allocated spectrum of the visible light is different from the frequency of the allocated spectrum of the visible light.

18. The system of claim 10, wherein the processor instructions further cause the processor to:
perform configuration of the Li-Fi node, based on a set of configuration parameters;
identify at least one modification in the set of configuration parameters; and
perform re-configuration of the Li-Fi node, based on the at least one modification.

19. A non-transitory computer-readable storage medium having stored thereon, a set of computer-executable instructions causing a Li-Fi node comprising a computer comprising one or more processors to perform steps comprising:
establishing a visible light connection with each of the plurality of Li-Fi enabled devices based on control messages received from each of the plurality of Li-Fi enabled devices;
receiving device information from each of the plurality of Li-Fi enabled devices connected to the Li-Fi node, in response to establishing the visible light connection with each of the plurality of Li-Fi enabled devices;
determining data rate requirement and service type requirement for each of the plurality of Li-Fi enabled devices based on the received device information from each of the plurality of Li-Fi enabled devices connected to the Li-Fi node; and
allocating a spectrum of the visible light to at least one Li-Fi enabled device from the plurality of Li-Fi enabled devices based on a data rate requirement and a service type requirement associated with the at least one Li-Fi enabled device.

* * * * *